United States Patent [19]

Kim

[11] Patent Number: 5,676,497
[45] Date of Patent: Oct. 14, 1997

[54] POWER DRILL-SAW WITH SIMULTANEOUS ROTATION AND RECIPROCATION ACTION

[76] Inventor: Young S. Kim, 108 N. Aberdeen Ave., Wayne, Pa. 19087

[21] Appl. No.: 679,541

[22] Filed: Jul. 12, 1996

Related U.S. Application Data

[63] Continuation-in-part of Ser. No. 394,728, Feb. 27, 1995, abandoned.

[51] Int. Cl.$^6$ ............................................. B23B 45/16
[52] U.S. Cl. .......................... 408/21; 74/22 R; 144/35.2; 408/26
[58] Field of Search .................. 74/22 R; 144/35.2; 408/20–22, 26

[56] References Cited

U.S. PATENT DOCUMENTS

| | | | |
|---|---|---|---|
| 2,238,578 | 4/1941 | Burkeman | 408/22 |
| 2,629,113 | 2/1953 | Chafins | 408/21 |
| 2,918,955 | 12/1959 | Simas | 408/22 |
| 2,970,483 | 2/1961 | Schrum, Sr. | 74/22 R |
| 3,260,289 | 7/1966 | Whitten, Jr. | 83/699.21 |
| 3,327,749 | 6/1967 | Hunn | 408/22 |
| 3,704,517 | 12/1972 | Deterling | 408/26 |

*Primary Examiner*—Steven C. Bishop
*Attorney, Agent, or Firm*—Elman & Associates

[57] ABSTRACT

The invention disclosed herein is a simple but versatile sawing device for effectively and efficiently cutting or sawing hard solid materials. A driving mechanism consisting of three slidably-associated elements converts a rotational force into a dual rotatory/reciprocatory motion. A cam key may be disengaged to permit the device to be used to drill into a surface. Also disclosed is a novel cutting-rod element that is a hard metal rod with cutting teeth of a unique shape on its surface.

4 Claims, 1 Drawing Sheet

1

POWER DRILL-SAW WITH SIMULTANEOUS ROTATION AND RECIPROCATION ACTION

This is a continuation-in-part of U.S. patent application Ser. No. 08/394,728, filed Feb. 27, 1995, now abandoned.

BACKGROUND OF THE INVENTION

The present invention relates to a device that can be used for both drilling and sawing effectively and efficiently in hard or solid materials. More specifically, the present invention relates to a saw with a unique combination of reciprocating and rotating movements that is powered by a rotatory power source. The invention comprises a novel sawing element and a driving mechanism therefor that generates a rotating, reciprocating stroke. The driving mechanism can be partially disengaged to permit rotation without the accompanying reciprocatory action.

SUMMARY OF THE INVENTION

The present invention provides a simple but a versatile sawing device for effectively and efficiently cutting or sawing hard solid materials. The driving mechanism is a combination of three slidably-associated elements that convert a rotational force into a dual rotatory/reciprocatory motion. The novel sawing element is a hard metal cutting-rod with cutting teeth of a unique shape on its surface. The rod-saw of the present invention simultaneously rotates and moves the cutting-rod in long rectilinear reciprocating movements. Such movements are induced by the action of a cam cylinder upon a cam key. The cam cylinder has a cam groove positioned diagonally relative to the rotation axis, and that describes an elliptic orbit around the cam cylinder.

An object of the invention is to provide a sawing device that can simultaneously impart rotatory and reciprocatory motions to a cutting-rod.

The invention comprises an outer cylinder, a cam cylinder that fits slidably inside the outer cylinder and a drive shaft that is slidably connected to the cam cylinder. The cam cylinder has a shaft attached to it at the end opposite to the drive shaft and a cutting-rod-holding means such as a screw chuck is attached to the shaft.

The outer cylinder has a single stationary cam key positioned at one side that is positioned to fit into a cam groove that is positioned on the outer surface of the cam cylinder. The cam groove is diagonally positioned so that is traces an elliptical orbit around the cam cylinder. The outer cylinder has a base-plate attached to one end with a centrally located bearing to support the cam cylinder drive shaft. The base plate also serves to protect the cam cylinder. A cover is attached to the end of the outer cylinder opposite to the base plate. The cover carries a centrally located bearing to support the cam cylinder shaft attached to the cam cylinder and also serves to protect the cam cylinder.

The sawing element of this invention is a cutting-rod that is positionable in the cutting-rod-holding means. Rotation of the cam cylinder by the drive shaft imparts a reciprocatory motion to the cam cylinder by action of the cam groove upon the stationary cam key. The reciprocatory motion of the cam cylinder imparts both a reciprocatory and a rotatory motion to the cutting-rod positioned in said cutting-rod-holding means.

A further embodiment of the present invention has a screw chuck mounted on the cam cylinder shaft. In this embodiment of the invention the cam cylinder drive shaft is slidably-connected to the cam cylinder at by a sliding joint

2 mechanism that comprises a noncircular sliding joint portion and a compatibly shaped noncircular opening in the rotation center of said cam cylinder.

This form of the invention permits the cam cylinder to move in a rectilinear manner along the rotation axis when a rotatory motion is imparted to the cam cylinder drive shaft.

In another embodiment of the invention the cutting-rod is a sawing rod that comprises a rod with a drilling tip and sawing teeth helically arranged on the lateral surface of the rod.

In yet another embodiment of the invention the cutting-rod of the rotatory sawing device is formed to have two stop notches at the proximal end of the sawing rod in order to prevent slipping in the screw chuck.

In yet another embodiment of the invention the sawing teeth of the cutting-rod have the shape of an oblique rhomboidal prism. This unique shape permits each tooth to act in a cutting mode so that upon rotation and reciprocation of the cam cylinder.

An objective of the present invention is to provide a replaceable cutting-rod. The replaceable cutting-rod can be made in various sizes to serve the needs of the user. The replaceable cutting-rod also has uniquely designed sawing teeth.

Another objective of the present invention is to provide a device which uses a combination of a cylindrical cam and a sliding joint mechanism to effect simultaneous reciprocal and rotational movements by a single rotatory power source.

Yet another objective of the present invention is to provide a saw which does not require a separate drill to start sawing on a flat surface. The invention disclosed herein is designed so that the cam key may be disengaged from the cam cylinder thereby disenabling the reciprocatory function of the device. The cutting-rod of this invention has a tip formed to allow it to drill into a previously unperforated surface.

Still another objective of this invention is to provide a simple and light weight sawing device which can be used in an extended location. Such a device can be used, for example, for trimming tree branches in a high position.

Still another objective of the present invention is to provide a device that can be used both as a drilling and as a sawing machine usable for different applications. Cutting-rods for such a drilling and sawing machine can be made in a variety of sizes such that suitably sized cutting-rods may be chosen for particular applications as will be appreciated by one of skill in the art.

Further objectives of the invention are to provide other applications of the concurrent rotation and reciprocation mechanism.

BRIEF DESCRIPTION ON FIGURES

DETAILED DESCRIPTION OF INVENTION

Flat saw blades of various shapes and sizes are commonly used for sawing hard materials. Flat saw blades are used in both manual or mechanized sawing processes. These flat saw blades cut objects by a one dimensional reciprocating movement. U.S. Pat. No. 3,704,517 to Deterling discloses a rotating rod saw which has helical arrangement of common saw teeth on a metal rod. The rod saw disclosed by Deterling simply rotates like a drill and cutting is only achieved in a horizontal mode. U.S. Pat. No. 2,918,955 to Simas discloses a drill bit with sawing teeth formed and disposed in a manner similar to the teeth of a file. The drill bit disclosed by Simas has cutting teeth shaped like ordinary file teeth and has a fish scale arrangement on a conventional drill bit. Cutting teeth arranged in this way do not provide an effective sawing function by simple rotation of the bit and the bit of Simas is designed to be operated in conjunction with a manually-provided stroke action. U.S. Pat. No. 2,970,483 to Schrum, Sr., discloses a rotary impact drill. The rotary impact drill disclosed by Schrum, Jr., has a rotor having a sinuous groove, and generates a short, pulsating impact to the drill in a manner similar to a pneumatic road drill. However, such a vibratory impact device does not provide a suitable stroke action that is desirable for an efficient sawing device. U.S. Pat. No. 5,052,366 to Kashihara discloses a wire type of saw mounted on a steel bow, and a more complex arrangement of wire saw for certain applications. The device disclosed by Kashihara has no rotatory function and does not have cutting teeth. U.S. U.S. Pat. No. 4,488,840 to Marie, and U.S. Pat. No. 4,979,307 to Pollington, disclose rotary cutting tools. However, the tools discloses in these applications consist of modified rotary disk saws or a metal rod which has a replaceable cutting edge at one end of the rod.

The present invention operates by a different mechanism and from any of previous devices and offers numerous advantages over the previously available saws and drills.

Figure 1:
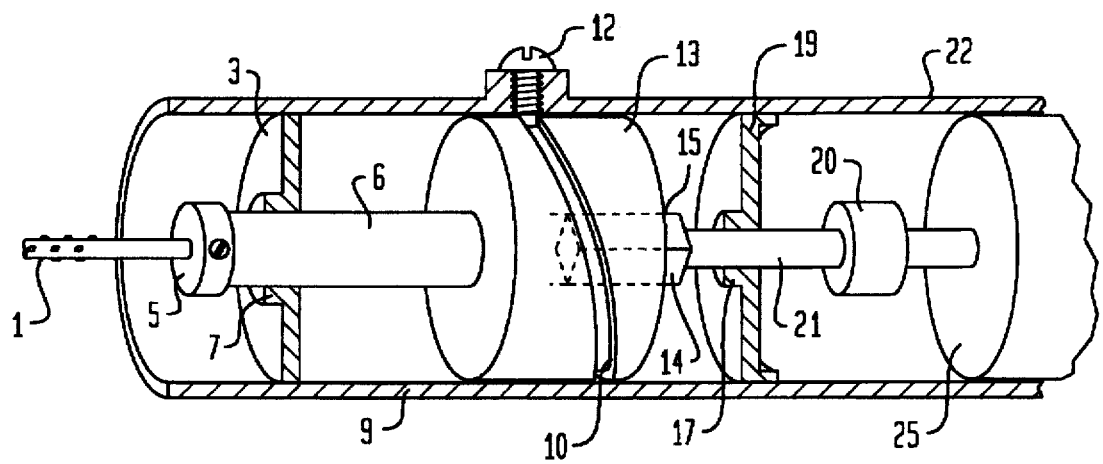
FIG. 1 shows a sectional view of the rotation/reciprocation cam mechanism with a rod-saw and a the sliding joint structure.

A typical embodiment of the present invention is illustrated in FIG. 1 which shows a diagram of the internal structure of a rotatory/reciprocatory cam mechanism of the present invention. The concurrent rotation and reciprocation motion is effected by combining a cylindrical cam action and a rectilinear sliding joint action empowered by a single motor power or by a common electric hand drill. A sawing rod 1 is firmly mounted in a screw chuck 5 on a cam cylinder shaft 6. A cam cylinder 13 has a cam groove 10 cut into its surface. The cam groove 10 is disposed in a diagonal manner to form an elliptic orbit around the cam cylinder 13. A stationary cam key 12 is positioned in a side of the outer cylinder 9 so that it fits into the cam groove 10 so that, upon rotation of the cam cylinder 13 it causes the cam cylinder 13 to move in a rectilinear manner along the rotation axis. A cylinder cover 3 is provided at the lower end of the outer cylinder 9 to protect the cam cylinder 13. The cylinder cover 3 has a centrally located bearing 7 for supporting the cam cylinder shaft 6. A cam cylinder drive shaft 21 is provided to permit connection of the device to a conventional drive motor 25. The cam cylinder drive shaft 21 drive is formed integrally with of a sliding joint shaft 14 that is slidably associated with a compatible sliding joint recess 15. The sliding joint essentially consists of a noncircular sliding joint shaft 14 and an identically shaped noncircular recess 15 positioned at the rotation center of the cam cylinder. In FIG. 1, the sliding joint shaft 14 and the sliding joint recess 15 are shown to have a square profile. The sliding joint allows the rectilinear motion of the cam cylinder 13 along the rotation axis when rotatory motion is induced by the drive motor 25.

A base-plate 19 is provided at the upper end of the outer cylinder 9. The base-plate 19 serves to protect the cam cylinder 13 and has a centrally located bearing 17 for supporting the sliding joint shaft 21. The sliding joint shaft 21 is also provided with a coupling 20 for connecting the sliding joint shaft 21 to motor 25. In the embodiment of the invention shown in figure i the outer cylinder 13 is extended by extension 22 to permit attachment of the invention to the motor 25. Rotational power is transmitted through coupling 20 to the sliding joint shaft 14.

Figure 2:
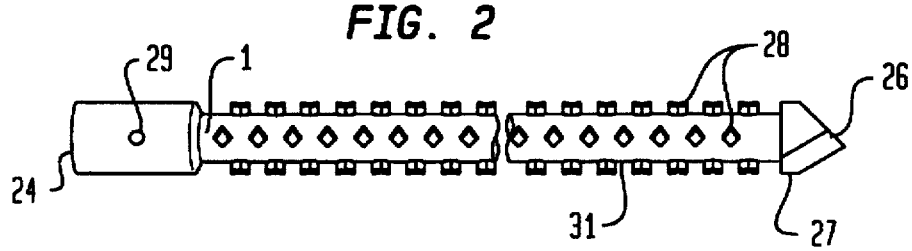
FIG. 2 shows an view of the sawing rod on which uniquely designed and arranged saw teeth are formed.

FIG. 2 shows a view of a sawing rod 1 with a drilling tip 26 at the distal 27 end of sawing rod 1 and sawing teeth 28 located on the lateral surface 31 of sawing rod 1. In the embodiment of the invention shown in FIG. 2, sawing teeth 28 are shown helically arranged on the lateral surface 31 of the sawing rod 1. Stop notches 29, (one shown) are formed at the proximal end 34 of sawing rod 1 to allow engagement of the screw of a screw chuck (not shown).

Figure 3:
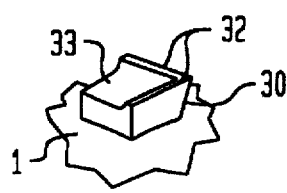
FIG. 3 shows a detailed design of a saw tooth which has a oblique rhombus prism shape, and vertical and horizontal multiple cutting edges.

FIG. 3 shows the details of a sawing tooth 28. The sawing tooth 28 has the shape of an oblique rhomboid prism and has two horizontal cutting edges 32 and a vertical cutting edge 30. The surface 33 of the cutting tooth 28 is relieved to enhance the cutting capacity of the cutting tooth 28.

Figure 4:
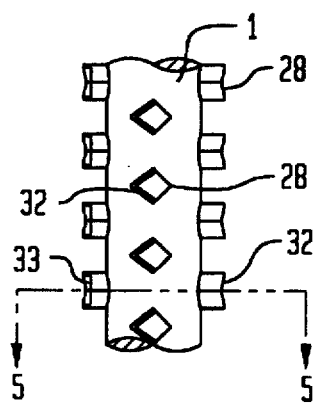
FIG. 4 shows an enlarged view of a portion of a sawing rod.

FIG. 4 shows an enlarged view of a portion of sawing rod 1. The helical positioning of the cutting teeth 28 is shown and the cutting edges 32 and the relieved surface 33 of cutting teeth 28 is illustrated.

Figure 5:
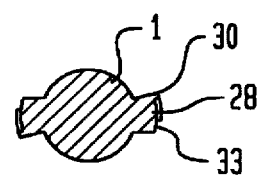
FIG. 5 shows a cross-section of a sawing rod where the cross-section passes through two opposed cutting teeth of the sawing rod.

FIG. 5 shows a cross-section of sawing rod 1 that passes through two opposed cutting teeth 28. The cutting edges 30 and 32, and the relieved surface 33 of the cutting teeth 28 is illustrated.

Operation of the Device

In use, a rod saw of a suitable size is firmly mounted in the screw chuck of invention disclosed herein. Upon starting the driving motor the cam cylinder is caused to rotate and the action of the cam groove upon the cam key the cam cylinder is caused to move in a reciprocatory manner rectilinearly along the rotation axis. Since the cam groove is formed diagonally around the cam cylinder surface, one full rotation of the cam cylinder causes the reciprocatory motion of the cam cylinder to make one full excursion. The ratio of the rotation and reciprocation can be varied by making cam groove on the cylinder cam in the form of a spiral instead of a simple ellipse. The device can be used as a drill machine by disengaging the cam key.

The saw teeth of the present invention is formed on the surface of a steel rod and is formed to have the shape of an oblique rhombus or triangular prism. The saw teeth are formed to have vertical and horizontal cutting edges and are distributed in a helical manner on the rod surface. One embodiment of the saw rod has its tip formed as a cutting tool so that sawing can be started on any flat surface. Accordingly, the invention disclosed in the present application is a simple, effective, efficient and multipurpose sawing device that can be used on many solid materials.

The advantages of the invention disclosed herein are several. First, the device permits the effective and efficient sawing of various kinds of textured solid materials because of the two dimensional cutting edges and rotation/reciprocation mechanism. Second, the device can be used as a drill by disengaging the cam key to allow the cylindrical cam to rotate without the reciprocatory motion. Third, the device may be powered by most existing drill machines. Fourth, the device is of light weight so it can be used to saw remote objects at an extended location by attaching the device to a long hollow pole through which the rotatory power can be transmitted. Fifth, unlike a conventional flat saw blade the device can smoothly cut complex shapes and acute angles without excessive stress on the saw rod.

Although the description above contains a detailed description of particular embodiments of the invention, these should not be construed as limiting the scope of the invention but as merely providing illustrations of some of the presently preferred embodiments of this invention. For example, the rod saw can be used for different materials such as for metals, plastics, wood, etc. Also, the concurrent rotation/reciprocation mechanism can be used in other applications. Thus, the scope of the invention should be determined by the appended claims and their legal equivalents rather than by the samples given.

Having described the invention, what is desired to claim and protect by Letters Patent is:

1. A rotatory sawing device comprising:

an outer cylinder with an upper end and a lower end;

a cam cylinder with first end and a second end;

a cam cylinder drive shaft slidably connected to said cam cylinder at said first end;

a cam cylinder shaft with a distal end, said cam cylinder shaft being attached to said cam cylinder at said second end;

cutting-rod holding means attached to said cam cylinder shaft;

a base-plate attached to said upper end of said outer cylinder with a bearing centrally located in said base-plate; said base-plate being to protect the cam cylinder and said bearing to support said cam cylinder drive shaft;

a cover attached to said lower end of said outer cylinder with a bearing centrally located thereon; said cover being to protect the cam cylinder and said bearing to support said cam cylinder shaft; and a cutting-rod having a proximal end and a distal end, said cutting-rod being positionable in said cutting-rod holding means; wherein:

said cam cylinder is slidably positioned within said outer cylinder;

said cam cylinder has a cam groove on its surface, said cam groove being diagonally positioned so as to trace an elliptical orbit around said cam cylinder;

a stationary cam key is positioned in a side of said outer cylinder, said cam key being positioned to fit into said cam groove of said cam cylinder; and said cutting-rod is centrally and axially attachable to said cam cylinder by said cutting-rod holding means;

whereby rotation of said cam cylinder imparts a reciprocatory motion to said cam cylinder by action of said cam groove upon said stationary cam key, said reciprocatory motion of said cam cylinder imparts a reciprocatory motion to a cutting-rod positioned in said cutting-rod holding means, and said cam key may be released to cause said cam cylinder to move in a solely rotatory manner.

2. The rotatory sawing device of claim 1 wherein:

said cutting-rod holding means is a screw chuck mounted on said cam cylinder shaft;

said cam cylinder drive shape slidably-connected to said cam cylinder at said first end is a sliding joint mechanism comprising a noncircular sliding joint portion and a compatibly shaped noncircular opening in the rotation center of said cam cylinder;

whereby said sliding joint mechanism permits said cam cylinder to move in a rectilinear manner along the rotation axis when a rotatory motion is imparted to said cam cylinder drive shaft;

said cutting-rod is a sawing rod comprising a rod with a distal drilling tip and sawing teeth arranged on the lateral surface of said cutting-rod in a helical mode.

3. The rotatory sawing device of claim 2 wherein:

said cutting-rod is additionally formed to have two stop notches formed at the proximal end of said cutting-rod to prevent slipping in said screw chuck.

4. The sawing rod of claim 2 wherein:

each of said sawing teeth has the shape of an oblique rhomboidal prism;

each of said sawing teeth has vertical and horizontal three dimensional cutting edges; and each of said teeth is positioned so that upon rotation and reciprocation of said cam cylinder, said teeth advance cuttingly.

* * * * *